(12) United States Patent
Ichikawa

(10) Patent No.: US 8,091,663 B2
(45) Date of Patent: Jan. 10, 2012

(54) HYBRID VEHICLE AND METHOD OF CONTROLLING THE SAME

(75) Inventor: Shinji Ichikawa, Toyota (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 351 days.

(21) Appl. No.: 12/464,316

(22) Filed: May 12, 2009

(65) Prior Publication Data

US 2009/0277705 A1 Nov. 12, 2009

(30) Foreign Application Priority Data

May 12, 2008 (JP) ................................. 2008-124676

(51) Int. Cl.
*B60W 10/00* (2006.01)

(52) U.S. Cl. ........... 180/65.265; 180/65.29; 180/65.275; 180/65.285

(58) Field of Classification Search ............. 180/65.265, 180/65.21, 65.29, 65.275, 65.285
See application file for complete search history.

(56) References Cited

FOREIGN PATENT DOCUMENTS

| | | |
|---|---|---|
| JP | 2001063347 | 3/2001 |
| JP | 2004-183501 A | 7/2004 |
| JP | 2005083243 | 3/2005 |
| JP | 3775391 B2 | 5/2006 |
| JP | 2007-176392 A | 7/2007 |

OTHER PUBLICATIONS

Office Action from Japanese Application No. 2008-124676 dated Dec. 8, 2009.

*Primary Examiner* — Eric Culbreth
(74) *Attorney, Agent, or Firm* — Gifford, Krass, Sprinkle, Anderson & Citkowski, P.C.

(57) ABSTRACT

In a charge mode (YES in S10), before charging of the electricity storage device by an external power source is started, electricity is supplied from an electricity storage device to an electrically-heated catalyzer (EHC) (S20) and an electrical resistance of the EHC is determined (S30). When it is determined based on the determined electrical resistance that there is no abnormality in the EHC (NO in S40), charging of the electricity storage device by the external power source is started (S50) and electricity is supplied from the external power source to the EHC (S60). When it is determined that there is an abnormality in the EHC (YES in S40), electricity is not supplied to the EHC (S70).

11 Claims, 8 Drawing Sheets

HYBRID VEHICLE AND METHOD OF CONTROLLING THE SAME

INCORPORATION BY REFERENCE

The disclosure of Japanese Patent Application No. 2008-124676 filed on May 12, 2008 including the specification, drawings and abstract is incorporated herein by reference in its entirety.

BACKGROUND OF THE INVENTION

1. Field of the Invention

The invention relates to a hybrid vehicle that is driven by motive power output from at least one of an internal combustion engine and a vehicle-driving electric motor and a method of controlling the hybrid vehicle, and in particular, to a hybrid vehicle in which an exhaust passage of the internal combustion engine is provided with an electrically-heated catalyzer and an on-board electricity storage device can be charged by an external power source outside of the vehicle and a method of controlling the hybrid vehicle.

2. Description of the Related Art

Japanese Patent Application Publication No. 2005-83243 (JP-A-2005-83243) discloses a device for increasing temperature of car exhaust gas. The exhaust gas temperature increasing device is provided between an internal combustion engine and a DPF device provided in an exhaust gas passage and increases the temperature of exhaust gas introduced from the internal combustion engine into the DPF device. In the exhaust gas temperature-increasing device, for example, after driving a vehicle, the temperature of exhaust gas is increased by electric power received from an external power source outside of the vehicle in a state where the vehicle is parked in a garage or a parking lot and the internal combustion engine is idled. In this way, it is possible to burn off the particulate material accumulated on a catalytic filter during driving (see JP-A-2005-83243).

In recent years, hybrid vehicles, which are driven by motive power output from at least one of an engine and a vehicle-driving electric motor, have attract public attention. A hybrid vehicle is equipped with an electricity storage device, an inverter, and a motor that is driven by the inverter as a driving power source, in addition to the conventional engine.

As such a hybrid vehicle, a vehicle is already available in which the electricity storage device mounted on the vehicle can be charged by an external power source. For example, the electricity storage device is charged by a domestic power source by connecting, through a charging cable, a charging port provided in the vehicle and a power socket provided in a house. Such a hybrid vehicle, in which the on-board electricity storage device can be charged by such an external power source is hereinafter also referred to as the "plug-in hybrid vehicle."

The plug-in hybrid vehicle is also equipped with an engine, and therefore, a catalyzer for purifying exhaust gas is needed. Because the plug-in hybrid vehicle can receive electric power from an external power source, an electrically-heated catalyzer (EHC) is provided in the exhaust gas passage and it is possible to supply electricity from the external power source to the EHC during charging of the electricity storage device by the external power source in preparation for start of the engine after the vehicle starts running.

However, when an electrical abnormality occurs in the EHC, there is a possibility that when the electricity storage device is charged by the external power source, an overcurrent flows from the external power source to the EHC, which can badly affect on the external power source. In the above-cited JP-A-2005-83243, there is no discussion concerning such a problem.

SUMMARY OF THE INVENTION

The invention makes it possible to prevent an overcurrent from flowing from an external power source to a vehicle during charging of an electricity storage device by the external power source in a hybrid vehicle in which an electrically-heated catalyzer is provided in an exhaust gas passage of an internal combustion engine and in which it is possible to charge the electricity storage device on the vehicle by the external power source.

A hybrid vehicle according to the invention is a hybrid vehicle that is driven by motive power output from at least one of an internal combustion engine and a vehicle-driving electric motor and includes an electricity storage device, an electricity receiving portion, a charging device, an electrically-heated catalyzer (EHC), and a controller. The electricity storage device stores electric power to be supplied to the electric motor. The electricity receiving portion receives electric power supplied from an external power source outside of the vehicle. The charging device performs voltage conversion of the electric power input through the electricity receiving portion to charge the electricity storage device. The EHC is provided in an exhaust passage of the internal combustion engine and is capable of electrically heating a catalyst for purifying exhaust gas discharged from the internal combustion engine. The controller determines an occurrence of an abnormality in the EHC by supplying electricity from the electricity storage device to the EHC before charging of the electricity storage device by the external power source is started and, when it is determined that there is no abnormality in the EHC, the controller performs electric power control so that charging of the electricity storage device by the external power source is started and electricity is supplied from the power source to the EHC.

The EHC may be electrically connected to the charging device. The controller may be configured such that the controller controls the charging device so that electricity is supplied from the electricity storage device to the EHC before charging of the electricity storage device by the power source is started, and that when it is determined that there is no abnormality in the EHC, the controller controls the charging device so that the electricity storage device is charged by the external power source and electricity is supplied from the power source to the EHC.

The controller may perform electric power control so that when it is determined that there is an abnormality in the EHC, supplying electricity from the external power source to the EHC is inhibited.

The controller may perform electric power control so that when it is determined that there is an abnormality in the EHC, supplying electricity from the external power source to the EHC is inhibited and charging of the electricity storage device by the external power source is performed.

The controller may determine the occurrence of an abnormality in the EHC by determining an electrical resistance of the EHC when electricity is supplied from the electricity storage device to the EHC.

The hybrid vehicle may further include an electricity generator and a drive mode control section. The electricity generator may generate electricity with the use of kinetic energy produced by the internal combustion engine to charge the electricity storage device. The drive mode control section may control switching between a first drive mode in which, until the state of charge of the electricity storage device falls to a predetermined level after charging of the electricity storage device by the power source is completed, the internal combustion engine is stopped and the vehicle is driven by the electric motor, and a second drive mode in which, when the state of charge falls to the predetermined level, the internal combustion engine is started and the vehicle is driven with the state of charge kept at a predetermined target level. When a requested driving force of the vehicle exceeds a predetermined value, the drive mode control section may start the internal combustion engine even in the first drive mode.

A method of controlling a hybrid vehicle according to the invention is a method of controlling a hybrid vehicle, which is driven by motive power output from at least one of an internal combustion engine and a vehicle-driving electric motor. The hybrid vehicle includes an electricity storage device, an electricity receiving portion, a charging device, and an EHC. The electricity storage device stores electric power to be supplied to the electric motor. The electricity receiving portion receives electric power supplied from an external power source outside of the vehicle The charging device performs voltage conversion of the electric power input through the electricity receiving portion to charge the electricity storage device. The EHC is provided in an exhaust passage of the internal combustion engine and is capable of electrically heating a catalyst for purifying exhaust gas discharged from the internal combustion engine. The controlling method includes: performing a determination of occurrence of an abnormality in the EHC by supplying electricity from the electricity storage device to the EHC before charging of the electricity storage device by the power source is started; and when it is determined that there is no abnormality in the EHC, performing electric power control so that charging of the electricity storage device by the external power source is started and electricity is supplied from the power source to the EHC.

The EHC may be electrically connected to the charging device. In performing the determination of occurrence of an abnormality, the charging device may be controlled so that electricity is supplied from the electricity storage device to the EHC before charging of the electricity storage device by the power source is started. When it is determined that there is no abnormality in the EHC, in performing the electric power control, the charging device may be controlled so that the electricity storage device is charged by the external power source and electricity is supplied from the power source to the EHC.

When it is determined that there is an abnormality in the EHC, supplying electricity from the power source to the EHC may be inhibited.

Electric power control may be performed so that when it is determined that there is an abnormality in the EHC, supplying electricity from the power source to the EHC is inhibited and charging of the electricity storage device by the external power source is performed.

The occurrence of an abnormality in the EHC may be determined by determining an electrical resistance of the EHC when electricity is supplied from the electricity storage device to the EHC.

In this invention, it is possible to cause a charging device to charge the electricity storage device by the external power source. The exhaust passage of the internal combustion engine is provided with the EHC. An occurrence of an abnormality in the EHC is determined by supplying electricity from the electricity storage device to the EHC before charging of the electricity storage device by the external power source is started and, when it is determined that there is no abnormality in the EHC, charging of the electricity storage device by the external power source is started and electricity is supplied from the external power source to the EHC. Thus, electric current does not flow from the external power source into the EHC that is determined to have an abnormality.

Accordingly, with the invention, it is possible to prevent an overcurrent from flowing from the external power source into the vehicle when the electricity storage device is charged by the external power source.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

Embodiments of the invention will be described in detail below with reference to drawings. The same or corresponding portions in the drawings are denoted by the same reference numerals and the description there of is not repeated.

First Embodiment

Figure 1:
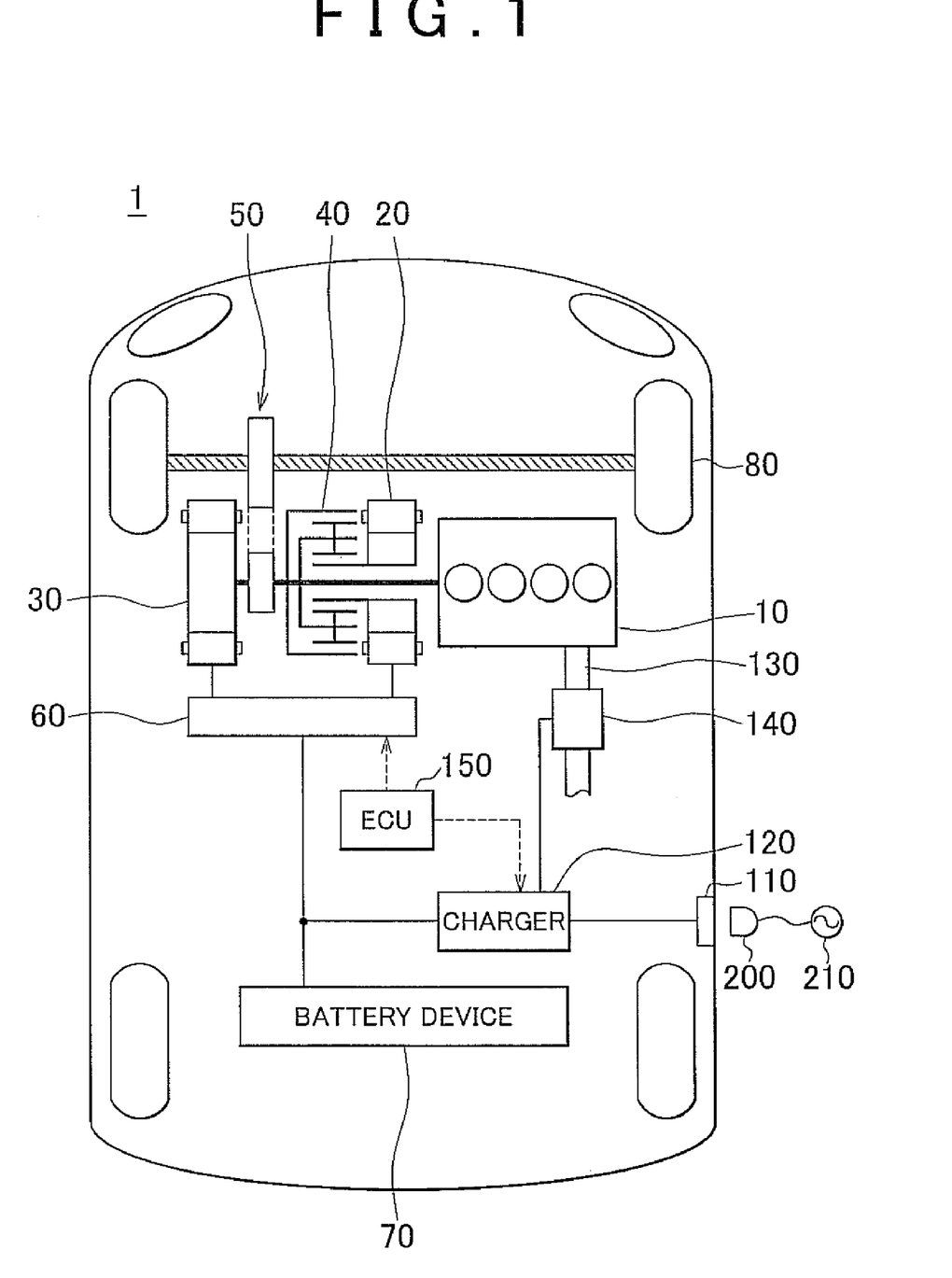
FIG. 1 is an overall block diagram of a plug-in hybrid vehicle according to a first embodiment of the invention.

FIG. 1 is an overall block diagram of a plug-in hybrid vehicle according to a first embodiment of the invention. Referring to FIG. 1, the plug-in hybrid vehicle 1 includes an engine 10, a first motor generator (MG) 20, a second MG 30, a power splitting mechanism 40, a speed reducer 50, a motor driver 60, an electricity storage device 70, and driving wheels 80. The plug-in hybrid vehicle 1 further includes a charging port 110, a charger 120, an exhaust passage 130, an electrically-heated catalyzer (EHC) 140, and an electronic control unit (ECU) 150.

The engine 10, the first MG 20 and the second MG 30 are connected to the power splitting mechanism 40. The plug-in hybrid vehicle 1 is driven by the driving force output from at least one of the engine 10 and the second MG 30. The motive power generated by the engine 10 is distributed to two paths by the power splitting mechanism 40. Specifically, one is a path in which power is transmitted to the driving wheels 80 through the speed reducer 50, and the other is a path in which power is transmitted to the first MG 20.

The first MG 20 and the second MG 30 are alternators, which are three-phase current generators, for example. The first MG 20 and the second MG 30 are driven by the motor driver 60. The first MG 20 generates electricity with the use of the motive power from the engine 10 that is split by the power splitting mechanism 40. The electric power generated by the first MG 20 is converted by the motor driver 60 from alternating current to direct current and stored in the electricity storage device 70.

The second MG 30 generates the driving force with the use of at least one of electric power stored in the electricity storage device 70 and the electric power generated by the first MG 20. The driving force from the second MG 30 is transmitted to the driving wheels 80 through the speed reducer 50. While the driving wheels 80 are front wheels in FIG. 1, instead of or in addition to the front wheels, rear wheels may be driven by the second MG 30.

During braking of a vehicle, for example, the second MG 30 is driven by the driving wheels 80 through the speed reducer 50 and functions as an electricity generator. Thus, the second MG 30 functions also as a regenerative brake that converts kinetic energy of the vehicle into electric power. The electric power generated by the second MG 30 is stored in the electricity storage device 70.

The power splitting mechanism 40 includes a planetary gear that has a sun gear, pinions, a carrier, and a ring gear. The pinions engage with the sun gear and the ring gear. The carrier is connected to a crankshaft of the engine 10 that rotatably supports the pinions. The sun gear is connected to the rotary shaft of the first MG 20. The ring gear is connected to the rotary shaft of the second MG 30 and the speed reducer 50.

Figure 2:
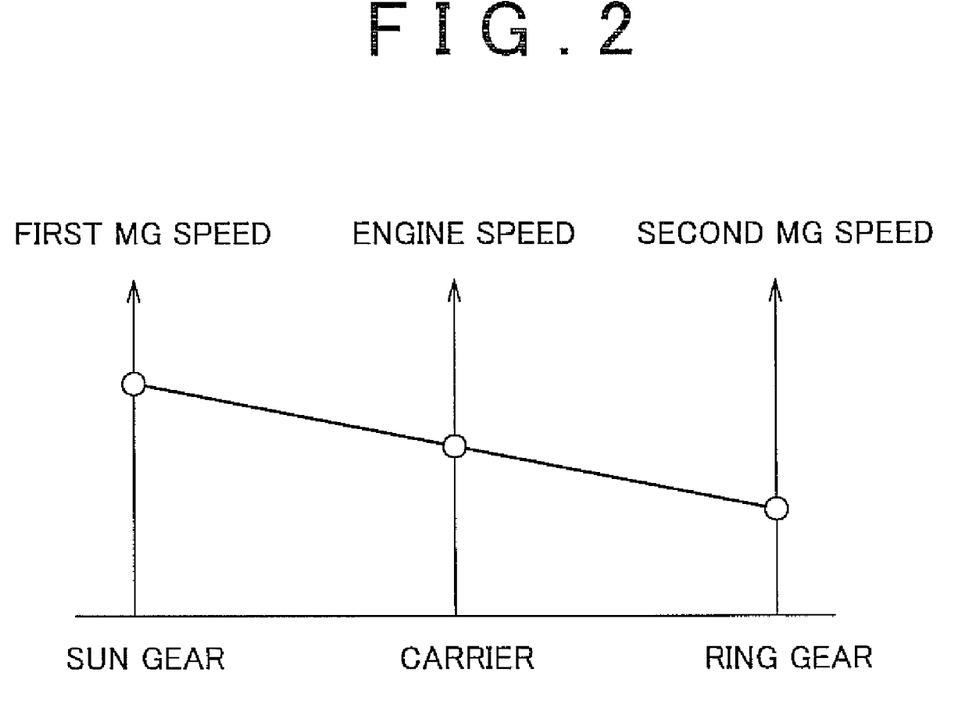
FIG. 2 is a diagram showing an alignment chart of a power splitting mechanism.

The engine 10, the first MG 20, and the second MG 30 are connected through the power splitting mechanism 40, which includes the planetary gear, so that the rotational speeds of the engine 10, the first MG 20 and the second MG 30 are in a relation such that the rotational speeds are connected by a straight line in an alignment chart.

Referring again to FIG. 1, the motor driver 60 receives electric power from the electricity storage device 70 and drives the first MG 20 and the second MG 30 based on the control signal from the ECU 150. In addition, based on the control signal from the ECU 150, the motor driver 60 converts the alternating-current power generated by the first MG 20 and/or the second MG 30 into direct-current power and outputs the direct-current power to the electricity storage device 70.

The electricity storage device 70 is a rechargeable direct-current power source, which is, for example, a secondary battery such as a nickel-metal-hydride battery or a lithium ion battery. The voltage of the electricity storage device 70 is approximately 200 V, for example. In addition to the electric power generated by the first MG 20 and the second MG 30, as described later, the electric power supplied from an external power source 210 is stored in the electricity storage device 70. Note that a high-capacity capacitor can be used as the electricity storage device 70.

The charging port 110 is an electric power interface used for receiving 6 electricity from the external power source 210. When the electricity storage device 70 is charged by the external power source 210, a connector 200 of a charging cable for supplying electric power from the external power source 210 to the vehicle is connected to the charging port 110, The charger 120 is electrically connected to the charging port 110, the electricity storage device 70, and the EHC 140 (described later). When the operation mode is in a charge mode in which the electricity storage device 70 is charged by the external power source 210, the charger 120 transforms the electric power supplied from the external power source 210 to the voltage level of the electricity storage device 70, based on the control signal from the ECU 150, to charge the electricity storage device 70.

When the operation mode is in the charge mode, based on the control signal from the ECU 150, the charger 120 supplies electricity from the electricity storage device 70 to the EHC 140 before the external power source 210 actually starts charging the electricity storage device 70. The ECU 150 determines whether there is an abnormality in the EHC 140 while the electricity storage device 70 supplies electricity to the EHC 140 and, when it is determined that the EHC 140 is normal, the charger 120 charges the electricity storage device 70 with the use of the external power source 210 and supplies electricity from the external power source 210 to the EHC 140, based on the control signal from the ECU 150. On the other hand, when it is determined that there is an abnormality in the EHC 140, the charger 120 charges the electricity storage device 70 with the use of the external power source 210 but does not supply electricity from the external power source 210 to the EHC 140.

The EHC 140 is provided in the exhaust passage 130 of the engine 10 and is capable of electrically heating the catalyst used to purify the exhaust gas discharged from the engine 10. The EHC 140 is electrically connected to the charger 120 and receives electric power for operation from the charger 120. Note that various known EHCs can be used as the EHC 140.

The ECU 150 generates a control signal for driving the motor driver 60 and the charger 120 and outputs the generated control signal to the motor driver 60 and the charger 120. The configuration of the ECU 150 will be described in detail later.

Figure 3:
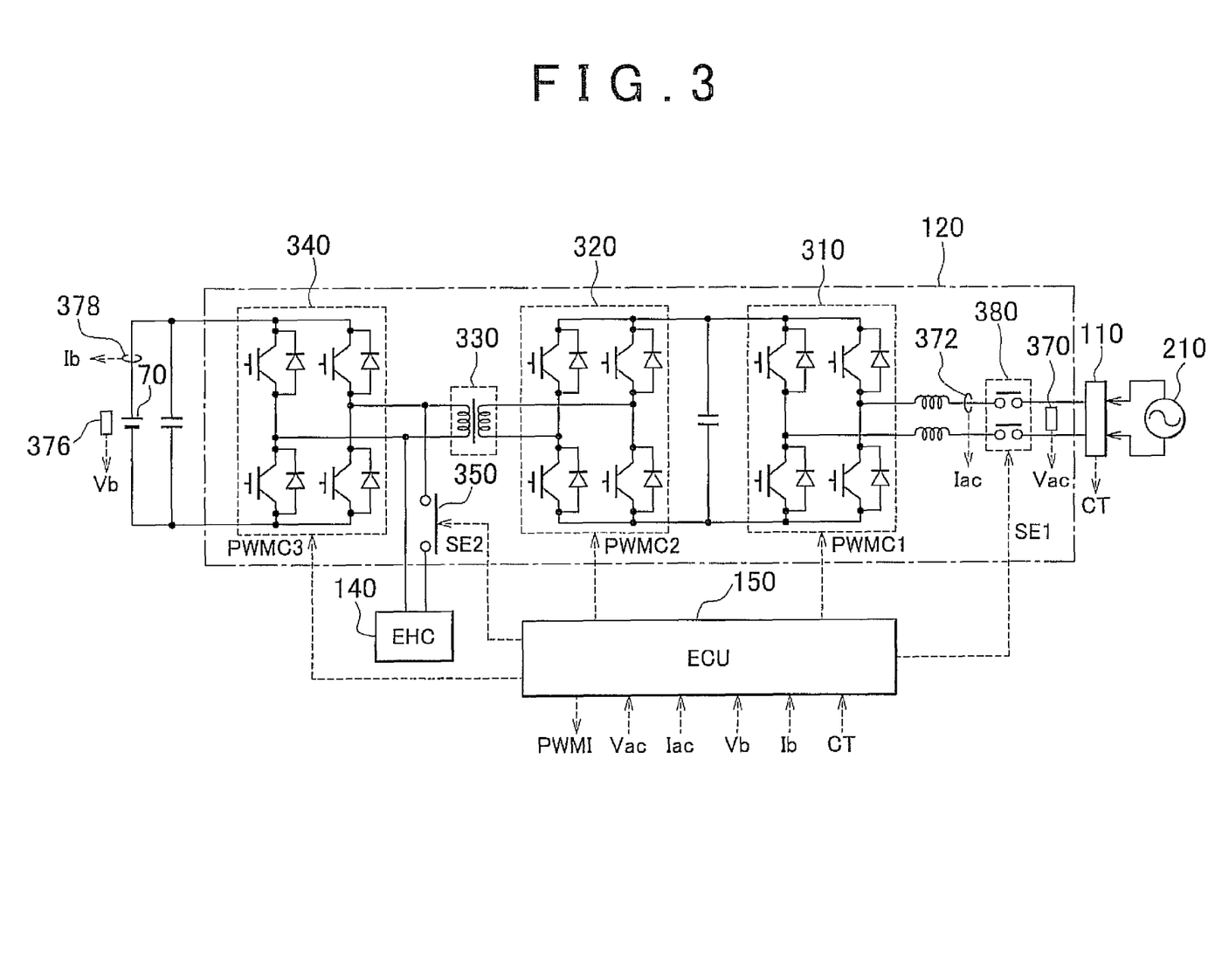
FIG. 3 is a detailed configuration diagram of a charger shown in FIG. 1.

FIG. 3 is a detailed configuration diagram of the charger 120 shown in FIG. 1. Referring to FIG. 3, the charger 120 includes voltage conversion portions 310, 320, and 340, an isolating transformer 330, relays 350 and 380, a voltage sensor 370, and an electric current sensor 372.

The relay 380 is placed between the charging port 110 and the voltage conversion portion 310 and is turned on/off based on a signal SE1 from the ECU 150. Each of the voltage conversion portions 310, 320, and 340 is a single phase bridge circuit. The voltage conversion portion 310 converts alternating-current power supplied from the external power source 210 through the charging port 110 to direct-current power and outputs the direct-current power to the voltage conversion portion 320, based on a control signal PWMC1 from the ECU 150. The voltage conversion portion 320 converts direct-current power supplied from the voltage conversion portion 310 to high-frequency alternating-current power and outputs the alternating-current power to the isolating transformer 330, based on a control signal PWMC2 from the ECU 150.

The isolating transformer 330 includes a core made of magnetic material, and a primary coil and a secondary coil, each wound around the core. The primary and secondary coils are electrically insulated from each other and connected to the voltage conversion portion 320 and the voltage conversion portion 340, respectively. The isolating transformer 330 transforms the alternating-current power received from the voltage conversion portion 320 to the voltage level according to the turns ratio between the primary coil and the secondary coil and outputs the resultant alternating-current power to the voltage conversion portion 340.

The voltage conversion portion 340 converts the alternating-current power output from the isolating transformer 330 to direct-current power and outputs the direct-current power to the electricity storage device 70 based on a control signal PWMC3 from the ECU 150. When electric power is supplied from the electricity storage device 70 to the EHC 140 as described later, the voltage conversion portion 340 converts the direct-current power supplied from the electricity storage device 70 to alternating-current power and outputs the alternating-current power to the EHC 140 based on the control signal PWMC3 from the ECU 150.

The EHC 140 is connected between the isolating transformer 330 and the voltage conversion portion 340 through the relay 350. The relay 350 is turned on/off based on a signal SE2 from the ECU 150. The EHC 140 may be connected between the isolating transformer 330 and the voltage conversion portion 320 through the relay 350.

The voltage sensor 370 detects voltage Vac of the external power source 210 supplied through the charging port 110 and outputs the detected value to the ECU 150. The electric current sensor 372 detects electric current Iac supplied through the charging port 110 and outputs the detected value to the ECU 150. A voltage sensor 376 detects voltage Vb of the electricity storage device 70 and outputs the detected value to the ECU 150. An electric current sensor 378 detects electric current Ib supplied to and from the electricity storage device 70 and outputs the detected value to the ECU 150.

Figure 4:
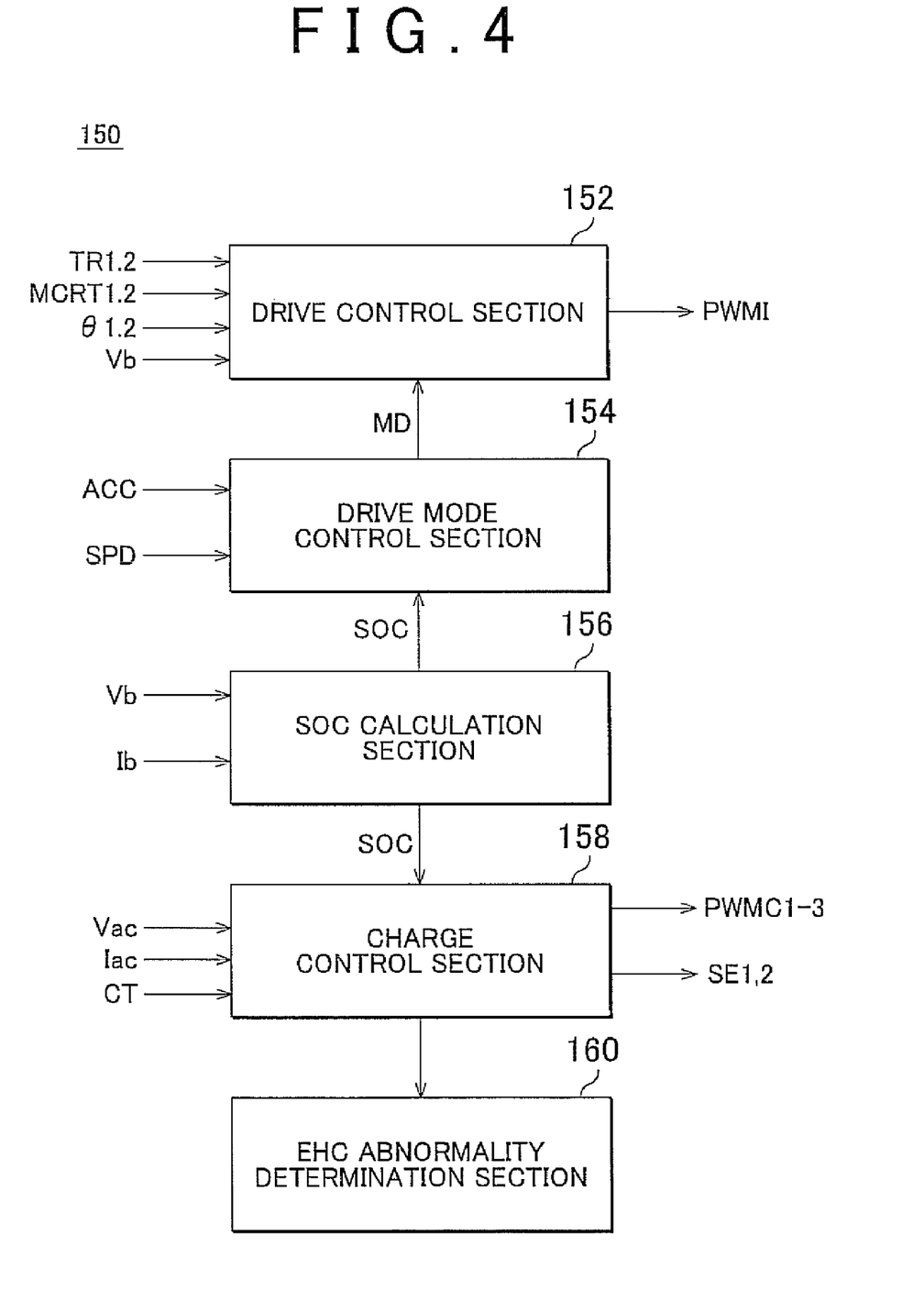
FIG. 4 is a functional block diagram showing a functional configuration of an ECU.

FIG. 4 is a functional block diagram showing a functional configuration of the ECU 150. Referring to FIG. 4, the ECU 150 includes a drive control section 152, a drive mode control section 154, an SOC calculation section 156, a charge control section 158, and an EHC abnormality determination section 160.

The drive control section 152 generates a control signal PWMI for driving the first MG 20 and the second MG 30, based on; a target torque value TR1, a motor current MCRT1, and a motor rotation angle θ1 of the first MG 20; a target torque value TR2, a motor current MCRT2, and a motor rotation angle θ2 of the second MG 30; the voltage Vb of the electricity storage device 70 (corresponding to the input voltage of the motor driver 60); and a signal MD from the drive mode control section 154, which indicates a drive mode (EV drive mode/HV drive mode) of the vehicle, and the drive control section 152 outputs the generated control signal PWMI to the motor driver 60.

The target torque values TR1 and TR2 are calculated by a vehicle ECU (not shown), based on an accelerator pedal operation amount, a vehicle speed, etc. The motor currents MCRT1, MCRT2, and the motor rotation angles θ1, θ2 are detected by sensors (not shown).

The drive mode control section 154 controls the drive mode (EV drive mode/HV drive mode) of the vehicle, based on an accelerator pedal operation amount signal ACC indicative of the amount of operation of an accelerator pedal, a vehicle speed signal SPD indicative of speed of the vehicle, and a signal SOC from the SOC calculation section 156, indicative of the state of charge (also referred to as the "SOC," which is expressed as a percent relative to the fully charged state, for example) of the electricity storage device 70. Specifically, until the SOC of the electricity storage device 70 is reduced to a predetermined level, the drive mode control section 154 selects and keeps the EV drive mode, in which the engine 10 is stopped and the vehicle is driven by the second MG 30, unless a large amount of vehicle driving force is required. When the SOC of the electricity storage device 70 is reduced to the predetermined level, the drive mode control section 154 selects the HV drive mode in which the engine 10 is started to cause the first MG 20 to generate electricity, whereby the vehicle is driven with the SOC of the electricity storage device 70 kept at a predetermined target level.

When the accelerator pedal is deeply depressed and a large amount of vehicle driving force is thus required, the engine 10 is started to secure the vehicle driving force even when the vehicle is in the EV drive mode.

Figure 5:
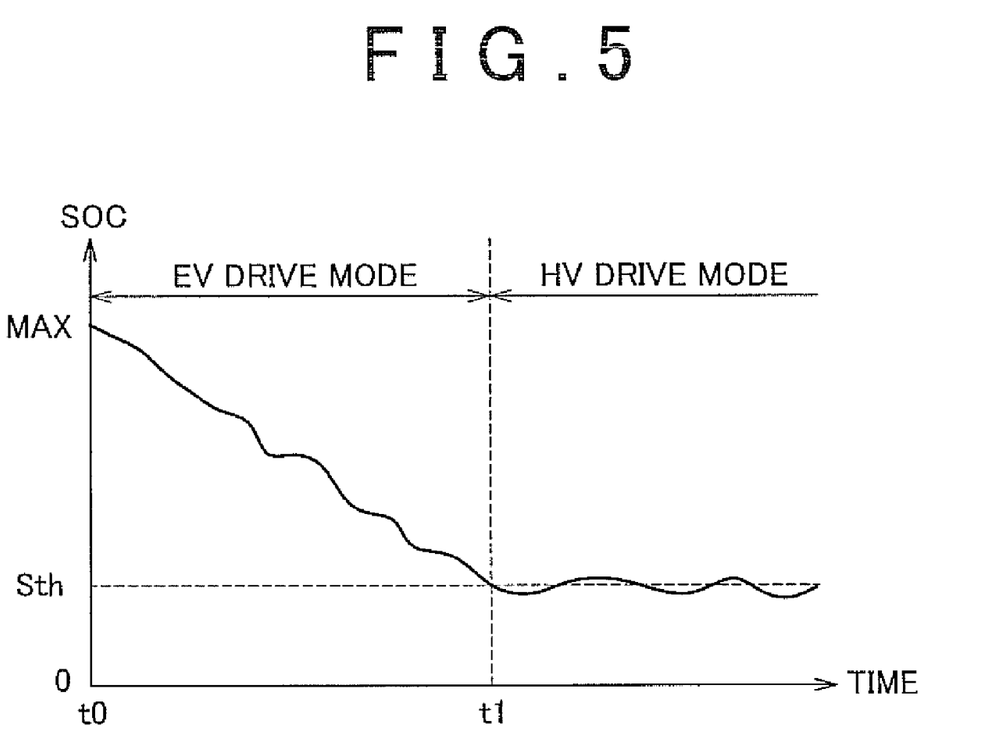
FIG. 5 is a diagram showing a shift of a drive mode.

FIG. 5 is a diagram showing a shift of the drive mode. Referring to FIG. 5, it is assumed that after charging of the electricity storage device 70 by the external power source 210 is completed, the vehicle starts running at time t0 from the state where the electricity storage device 70 is fully charged. Until the SOC of the electricity storage device 70 falls below a predetermined threshold value Sth at time t1, in principle, the engine 10 is stopped and the plug-in hybrid vehicle 1 runs in the EV drive mode. When the SOC of the electricity storage device 70 falls below the threshold value Sth at time t1, the engine 10 is started and the drive mode is changed from the EV drive mode to the HV drive mode.

When the accelerator pedal is deeply depressed and a large amount of vehicle driving force is thus required, the engine 10 is started to output the vehicle driving force also from the engine 10 even when the drive mode is the EV drive mode. Specifically, in this plug-in hybrid vehicle 1, even immediately after the vehicle starts running in a state where the SOC of the electricity storage device 70 is the fully charged state after charging of the electricity storage device 70 has been completed the engine 10 may be started. Thus, in this plug-in hybrid vehicle 1, when the electricity storage device 70 is charged by the external power source 210, electricity is supplied to the EHC 140 with the use of the electric power supplied from the external power source 210 in case that the engine 10 is started after the vehicle starts running.

Referring again to FIG. 4, the SOC calculation section 156 calculates the SOC of the electricity storage device 70 using a predetermined SOC calculation method based on the detected values of the voltage Vb and the electric current Ib of the electricity storage device 70. Note that various known methods can be used as the method of calculating the SOC.

The charge control section 158 determines whether the operation mode of the vehicle is the charge mode, based on a signal CT indicative of connection of a charging cable to the charging port 110. When the operation mode is the charge mode, the charge control section 158 outputs the signal SE1 for turning on the relay 380 (FIG. 3) to the charger 120 and, based on the detected values of the voltage Vac and the electric current Iac of the external power source 210, generates the control signals PWMC1 to PWMC3 for charging the electricity storage device 70 by the external power source 210 and outputs the control signals PWMC1 to PWMC3 to the charger 120.

Before starting charging the electricity storage device 70 by the external power source 210, the charge control section 158 outputs the signal SE2 for turning on the relay 350 (FIG. 3) to the charger 120 and generates the control signal PWMC3 for supplying electricity from the electricity storage device 70 to the EHC 140 to output the control signal PWMC3 to the voltage conversion portion 340 of the charger 120. While electricity is supplied from the electricity storage device 70 to the EHC 140, the charge control section 158 outputs the command to perform determination of the occurrence of an abnormality in the EHC 140 to the abnormality determination section 160.

When the EHC abnormality determination section 160 determines that the EHC 140 is normal, as described above, the charge control section 158 outputs the signal SE1 for turning on the relay 380 (FIG. 3) to the charger 120 and in addition, the charge control section 158 generates the control signals PWMC1 to PWMC3 for charging the electricity storage device 70 by the external power source 210 and outputs the control signals PWMC1 to PWMC3 to the charger 120. On the other hand, when the EHC abnormality determination section 160 determines that there is an abnormality in the EHC 140, the charge control section 158 outputs the signal SE2 for turning off the relay 350 (FIG. 3) to the charger 120 to inhibit supply of electricity to the EHC 140 and in addition, the charge control section 158 generates the control signals PWMC1 to PWMC3 for charging the electricity storage device 70 by the external power source 210 and outputs the control signals PWMC1 to PWMC3 to the charger 120.

When the EHC abnormality determination section 160 receives the command to perform determination of the occurrence of an abnormality in the EHC 140 from the charge control section 158, the EHC abnormality determination section 160 determines whether there is an electrical abnormality in the EHC 140. For example, the EHC abnormality determination section 160 may determine the electrical resistance of the EHC 140 when electricity is supplied from the electricity storage device 70 to the EHC 140, and may determine whether there is an electrical abnormality in the EHC 140, based on the determined value of the electrical resistance. As the method of determining the electrical resistance of the EHC 140, a method, in which the resistance value is determined by applying voltage pulses to the EHC 140, or a method, in which the resistance value is calculated based on the electric power and the electric current supplied to the EHC 140, may be adopted.

Figure 6:
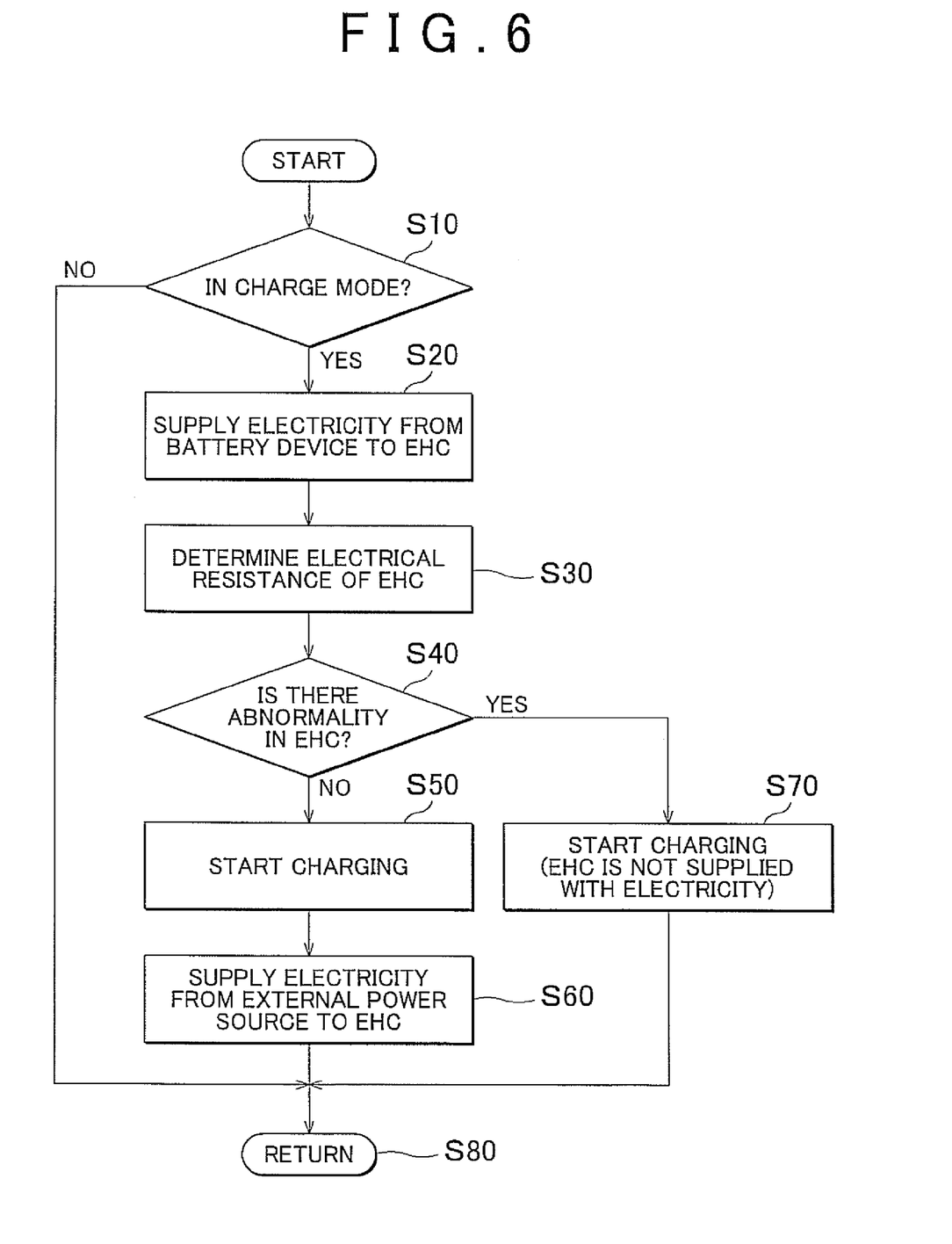
FIG. 6 is a flow chart for explaining a process flow of charge control performed by the ECU.

FIG. 6 is a flow chart for explaining a process flow of charge control performed by the ECU 150. The process of this flow chart is called by the main routine and executed at predetermined intervals or every time predetermined conditions are met.

Referring to FIG. 6, the ECU 150 determines whether the operation mode of the vehicle is the charge mode (step S10). For example, the ECU 150 determines that the operation mode is the charge mode as long as the connection between the connector 200 of the external power source 210 (FIG. 1) and the charging port 110 (FIG. 1) is detected. When it is determined that the operation mode is not the charge mode (NO in step S10), the ECU 150 does not perform the subsequent steps and the process proceeds to step S80.

When it is determined in step S10 that the operation mode is the charge mode (YES in step S10), the ECU 150 turns on the relay 350 (FIG. 3) to electrically connect the EHC 140 to the charger 120 and drives the voltage conversion portion 340, thereby supplying electricity from the electricity storage device 70 to the EHC 140 (step S20). While electricity is supplied from the electricity storage device 70 to the EHC 140, the ECU 150 determines the electrical resistance of the EHC 140 to determine whether there is an electrical abnormality in the EHC 140 (step S30).

When the determined electrical resistance of the EHC 140 is higher than a predetermined value and it is determined that there is no abnormality in the EHC 140 (NO in step S40), the ECU 150 turns on the relay 380 (FIG. 3) and causes the charger 120 to start charging the electricity storage device 70 by the external power source 210 (step S50). Then, the ECU 150 keeps the relay 350 turned on to charge the electricity storage device 70 by the external power source 210 and supply electricity from the external power source 210 to the EHC 140 (step S60).

On the other hand, in step S40, when the electrical resistance of the EHC 140 determined in step S30 is lower than the predetermined value and it is therefore determined that there is an abnormality in the EHC 140 (YES in step S40), the ECU 150 turns off the relay 350 to electrically disconnect the EHC 140 from the charger 120. The ECU 150 then turns on the relay 380 and causes the charger 120 to start charging the electricity storage device 70 by the external power source 210 (step S70). Because the EHC 140 is electrically disconnected from the charger 120, electricity is not supplied to the EHC 140 while the electricity storage device 70 is charged by the external power source 210.

As described above, in the first embodiment, the charger 120 can be used to charge the electricity storage device 70 by the external power source 210. The exhaust passage 130 of the engine 10 is provided with the EHC 140. Before charging of the electricity storage device 70 by the external power source 210 is started, the electrical resistance of the EHC 140 is determined by supplying electricity from the electricity storage device 70 to the EHC 140 and the determination of the occurrence of an abnormality in the EHC 140 is performed based on the determined electrical resistance. When it is determined that there is no abnormality in the EHC 140, charging of the electricity storage device 70 by the external power source 210 is started and electricity is supplied from the external power source 210 to the EHC 140. Thus, electric current does not flow from the external power source 210 into the EHC 140 that is determined to have an abnormality. Accordingly, with this first embodiment, it is possible to prevent an overcurrent from flowing from the external power source 210 into the vehicle when the electricity storage device 70 is charged by the external power source 210.

Second Embodiment

In the first embodiment, the voltage of the electric power supplied from the external power source 210 is converted by the charger 120 to charge the electricity storage device 70. A second embodiment shows a configuration in which the electric power supplied from the external power source 210 is applied to the neutral points of the first MG 20 and the second MG 30, and the electricity storage device 70 is charged using the motor coils of the first MG 20 and the second MG 30, and using inverters that are components of the motor driver 60.

Figure 7:
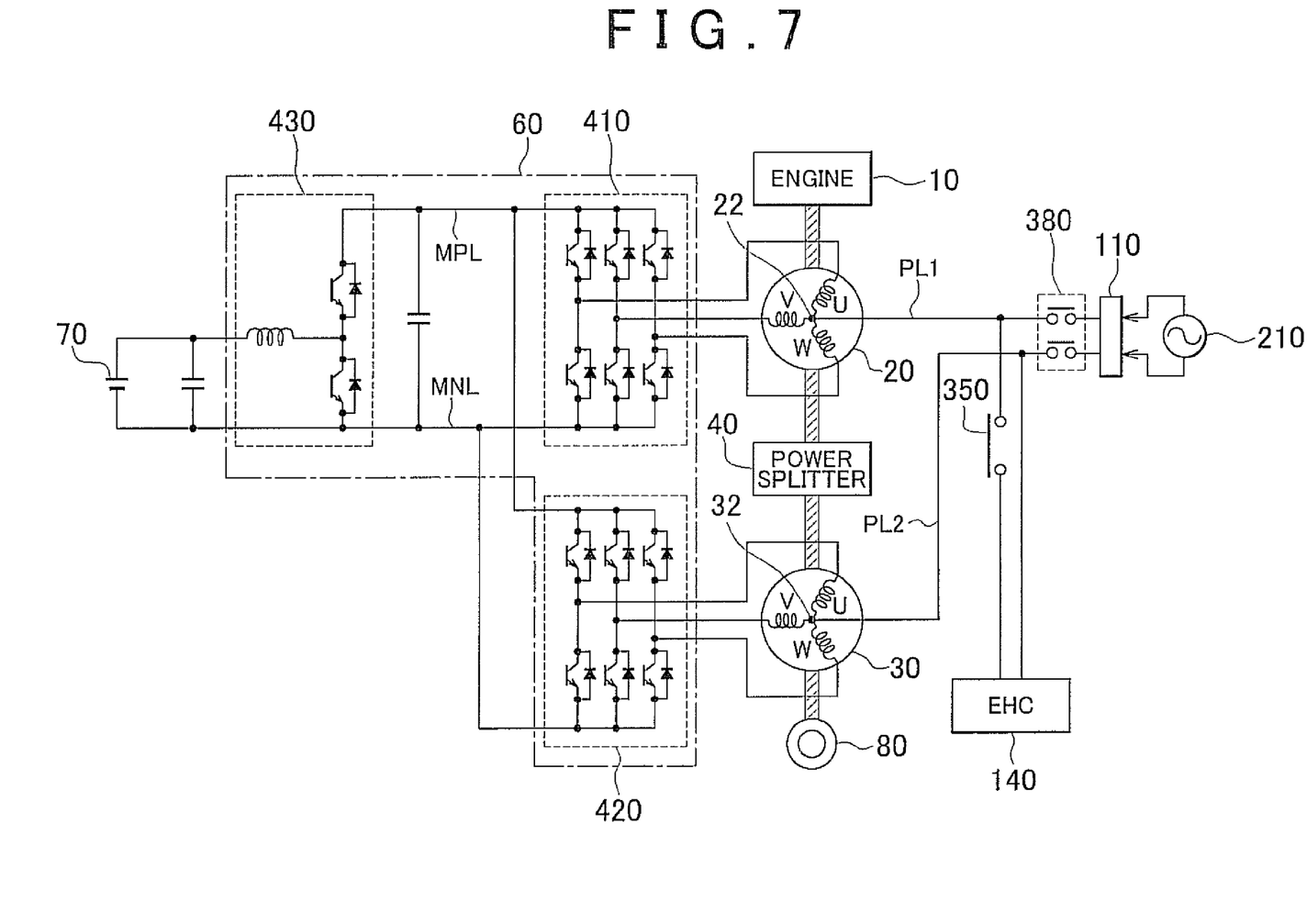
FIG. 7 is a configuration diagram of an electric system of a plug-in hybrid vehicle according to a second embodiment.

FIG. 7 is a configuration diagram of an electric system of a plug-in hybrid vehicle according to the second embodiment. Referring to FIG. 7, one end of a power line PL1 is connected to a neutral point 22 of the first MG 20 and one end of a power line PL2 is connected to a neutral point 32 of the second MG 30. The other ends of the power lines PL1 and PL2 are connected to the charging port 110. The EHC 140 is connected to the power lines PL1 and PL2 through the relay 350.

The motor driver 60 that drives the first MG 20 and the second MG 30 includes a first inverter 410, a second inverter 420, and a boost converter 430.

The first inverter 410 and the second inverter 420 are provided corresponding to the first MG 20 and the second MG 30 and are connected in parallel to a main positive bus line MPL and a main negative bus line MNL. Each of the first inverter 410 and the second inverter 420 is a three-phase bridge circuit.

The first inverter 410 receives electric power through the main positive bus line MPL and the main negative bus line MNL to drive the first MG 20. The first inverter 410 converts the alternating-current power that the first MG 20 generates using the motive power from the engine 10 to direct-current power and outputs the direct-current power to the main positive bus line MPL and the main negative bus line MNL. The second inverter 420 receives electric power through the main positive bus line MPL and the main negative bus line MNL to drive the second MG 30. During braking of the vehicle, the second inverter 420 converts the alternating-current power that the second MG 30 generates using the kinetic energy of the vehicle received from the driving wheels 80 to direct-current power and outputs the direct-current power to the main positive bus line MPL and the main negative bus line MNL.

When the electricity storage device 70 is charged by the external power source 210, the first inverter 410 and the second inverter 420 convert the alternating-current power, applied from the external power source 210 to the neutral point 22 of the first MG 20 and to the neutral point 32 of the second MG 30 through the power lines PL1 and PL2, to direct-current power, and output the direct-current power to the main positive bus line MPL and the main negative bus line MNL by the method described later. Prior to charging the electricity storage device 70 by the external power source 210, the first inverter 410 and the second inverter 420 generate alternating voltage between the neutral points 22 and 32 by the method described later, and output the alternating voltage to the EHC 140 through the power lines PL1 and PL2.

The boost converter 430 is provided between the electricity storage device 70, and the main positive bus line MPL and the main negative bus line MNL. The boost converter 430 is made up of a reactor and a direct-current chopper circuit including two switching elements. The boost converter 430 regulates the voltage between the main positive bus line MPL and the main negative bus line MNL to a predetermined voltage equal to or higher than the voltage of the electricity storage device 70.

Figure 8:
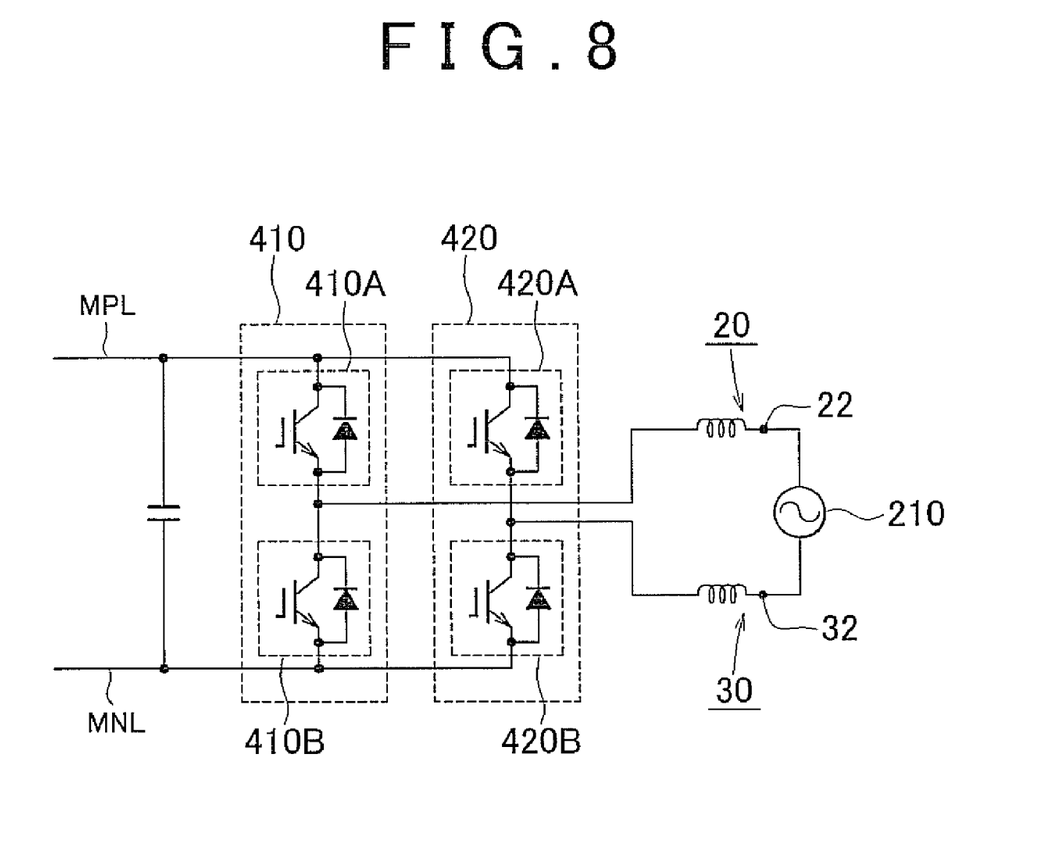
FIG. 8 is a diagram showing a zero-phase equivalent circuit of first and second inverters, and first and second MGs shown in FIG. 7.

FIG. 8 is a diagram showing a zero-phase equivalent circuit of the first and second inverters 410 and 420, and the first and second MGs 20 and 30 shown in FIG. 7. Each of the first inverter 410 and the second inverter 420 is a three-phase bridge circuit as shown in FIG. 7, and the number of on/off combinations of six switching elements in each inverter is eight. In two of the eight combinations, the inter-phase voltage is zero and such a state of voltage is referred to as the zero voltage vector. With regard to the zero voltage vector, it can be assumed that the three switching elements in an upper arm are in the same switching state (all of the switches are on or off) and the three switching elements in a lower arm are also in the same state.

When the electricity storage device 70 is charged by the external power source 210, the zero voltage vector is controlled in the first inverter 410 and the second inverter 420. Thus, in FIG. 8, the three switching elements in the upper arm of the first inverter 410 are collectively illustrated as the upper arm 410A and the three switching elements in the lower arm of the first inverter 410 are collectively illustrated as the lower arm 410B. Similarly, the three switching elements in the upper arm of the second inverter 420 are collectively illustrated as the upper arm 420A and the three switching elements in the lower arm of the second inverter 420 are collectively illustrated as the lower arm 420B.

As shown in FIG. 8, the zero-phase equivalent circuit can be regarded as a single-phase PWM converter that receives, as the input, the single-phase alternating-current power applied from the external power source 210 to the neutral point 22 of the first MG 20 and to the neutral point 32 of the second MG 30. In the first and second inverters 410 and 420, by performing switching control so that the zero voltage vector is varied in the first and second inverters 410 and 420 and the first inverter.410 and the second inverter 420 operate as arms of a single-phase PWM converter, it is possible to convert the alternating-current power supplied from the external power source 210 to direct-current power to output the direct-current power to the main positive bus line MPL and the main negative bus line MNL.

Meanwhile, the zero-phase equivalent circuit can be regarded as a single-phase PWM inverter that generates alternating-current voltage between the neutral points 22 and 32 with the use of the direct-current voltage supplied from the main positive bus line MPL and the main negative bus line MNL. In the first and second inverters 410 and 420, by performing switching control so that the zero voltage vector is 10 varied in the first and second inverters 410 and 420 and the first inverter 410 and the second inverter 420 operate as arms of the single-phase PWM inverter, it is possible to convert the direct-current power supplied through the main positive bus line MPL and the main negative bus line MNL to alternating-current power, and supply the alternating-current power to the EHC 140 (not shown) through the power lines PL1 and PL2 that are connected to the neutral points 22 and 32, respectively.

Referring again to FIG. 7, in the second embodiment, the first MG 20, the second MG 30, and the motor driver 60 implement the function similar to the function of the charger 120 of the first embodiment. The EHC 140 is connected to the power lines PL1 and PL2 through the relay 350, and as in the case of the first embodiment, charging 20 of the electricity storage device 70 by the external power source 210, power supply from the external power source 210 to the EHC 140, and power supply from the electricity storage device 70 to the EHC 140 before charging of the electricity storage device 70 by the external power source 210 is started, are performed.

As described above, in the second embodiment, the first MG 20, the second MG 30, and the motor driver 60 implement the function similar to the function of the charger 120 of the first embodiment. Thus, with this second embodiment it is possible to reduce the size and weight of a vehicle because there is no need to provide a separate charger 120.

In the above-described second embodiment, the boost converter 430 is not an essential element, and the invention can be applied to a system that is not equipped with a boost converter 430.

While, in the above-described embodiments, the EHC 140 is capable of electrically heating the catalyst used to purify the exhaust gas discharged from the engine 10, a heater capable of electrically heating the gas introduced into a catalyst may be provided upstream of the catalyst and a means for forcibly causing air to flow in the exhaust passage may be provided. As the means for causing air to flow in the exhaust passage, for example, an electric-assist turbocharger can be used, which is a turbocharger that forcibly rotates a turbine with the use of an electric motor to perform supercharging independent of the operating conditions. With this configuration, even when the electricity storage device 70 is being charged by the external power source 210, it is possible to cause air to flow in the exhaust passage by, with the use of the first MG 20, rotating the engine 10 without output and operating the electric-assist turbocharger and it is therefore possible to warm up the catalyst by electrically heating the air introduced into the catalyst by means of the heater.

While, in the above description of the embodiments, a series/parallel hybrid vehicle in which the motive power from the engine 10 is split by the power splitting mechanism 40 and transmitted to the driving wheels 80 and the first MG 20, the invention can be applied to a so-called parallel hybrid vehicle that has no power splitting mechanism and in which the wheels are driven by an engine and a motor.

The engine 10 functions as the "internal combustion engine" of the invention, and the second MG 30 functions as the "motor" of the invention. The charging port 110 functions as the "electricity receiving portion" of the invention, and the charger 120 functions as the "charging device" of the invention. The first inverter 410, the second inverter 420, the first MG 20, and the second MG 30 of the second embodiment also function as the "charging device" of the invention.

The EHC 140 functions as the "electrically-heated catalyst unit" of the invention, and the ECU 150 functions as the "controller" of the invention. The first MG 20 and the motor driver 60 function as the "electricity generator" of the invention.

It should be understood that the embodiments described herein are examples in all respects and are not restrictive. The scope of the invention is determined not by the description of the embodiments but by the claims and it is intended to cover all the modifications made within the scope of the claims and the equivalent thereof.

What is claimed is:

1. A hybrid vehicle, which is driven by motive power output from at least one of an internal combustion engine and a vehicle-driving electric motor, the hybrid vehicle comprising:
    an electricity storage device that stores electric power to be supplied to the electric motor;
    an electricity receiving portion that receives electric power supplied from an external power source outside of the vehicle;
    a charging device that performs voltage conversion of the electric power input through the electricity receiving portion to charge the electricity storage device;
    an electrically-heated catalyzer that is provided in an exhaust passage of the internal combustion engine and is capable of electrically heating a catalyst for purifying exhaust gas discharged from the internal combustion engine; and
    a controller that determines an occurrence of an abnormality in the electrically-heated catalyzer by supplying electricity from the electricity storage device to the electrically-heated catalyzer before charging of the electricity storage device by the power source is started and that, when it is determined that there is no abnormality in the electrically-heated catalyzer, performs electric power control so that charging of the electricity storage device by the power source is started and electricity is supplied from the power source to the electrically-heated catalyzer.

2. The hybrid vehicle according to claim 1, wherein:
    the electrically-heated catalyzer is electrically connected to the charging device; and
    the controller controls the charging device so that electricity is supplied from the electricity storage device to the electrically-heated catalyzer before charging of the electricity storage device by the power source is started, and when it is determined that there is no abnormality in the electrically-heated catalyzer, the controller controls the charging device so that the electricity storage device is charged by the power source and electricity is supplied from the power source to the electrically-heated catalyzer.

3. The hybrid vehicle according to claim 1, wherein the controller performs electric power control so that when it is determined that there is an abnormality in the electrically-heated catalyzer, supplying electricity from the power source to the electrically-heated catalyzer is inhibited.

4. The hybrid vehicle according to claim 3, wherein the controller performs electric power control so that when it is determined that there is an abnormality in the electrically-heated catalyzer, supplying electricity from the power source to the electrically-heated catalyzer is inhibited and the electricity storage device is charged by the power source.

5. The hybrid vehicle according to claim 1, wherein the controller determines the occurrence of an abnormality in the electrically-heated catalyzer by determining an electrical resistance of the electrically-heated catalyzer when electricity is supplied from the electricity storage device to the electrically-heated catalyzer.

6. The hybrid vehicle according to claim 1, further comprising:
    an electricity generator that generates electricity with the use of kinetic energy produced by the internal combustion engine to charge the electricity storage device; and
    a drive mode control section that controls switching between a first drive mode in which, until a state of charge of the electricity storage device falls to a predetermined level after charging of the electricity storage device by the power source is completed, the internal combustion engine is stopped and the vehicle is driven by the electric motor, and a second drive mode in which, when the state of charge falls to the predetermined level, the internal combustion engine is started and the vehicle is driven with the state of charge kept at a predetermined target level,
    wherein, when a requested driving force of the vehicle exceeds a predetermined value, the drive mode control section starts the internal combustion engine even in the first drive mode.

7. A method of controlling a hybrid vehicle, which is driven by motive power output from at least one of an internal combustion engine and a vehicle-driving electric motor, the hybrid vehicle including: an electricity storage device that stores electric power to be supplied to the electric motor;
    an electricity receiving portion that receives electric power supplied from an external power source outside of the vehicle;
    a charging device that performs voltage conversion of electric power input through the electricity receiving portion to charge the electricity storage device; and
    an electrically-heated catalyzer that is provided in an exhaust passage of the internal combustion engine and is capable of electrically heating a catalyst for purifying exhaust gas discharged from the internal combustion engine,
    the method comprising:
    performing a determination of occurrence of an abnormality in the electrically-heated catalyzer by supplying electricity from the electricity storage device to the electrically-heated catalyzer before charging of the electricity storage device by the power source is started; and
    when it is determined that there is no abnormality in the electrically-heated catalyzer, performing electric power control so that charging of the electricity storage device by the power source is started and electricity is supplied from the power source to the electrically-heated catalyzer.

8. The method of controlling a hybrid vehicle according to claim 7, wherein:
    the electrically-heated catalyzer is electrically connected to the charging device;
    in performing the determination of occurrence of an abnormality, the charging device is controlled so that electricity is supplied from the electricity storage device to the electrically-heated catalyzer before charging of the electricity storage device by the power source is started; and
    when it is determined that there is no abnormality in the electrically-heated catalyzer, in performing the electric power control, the charging device is controlled so that the electricity storage device is charged by the power source and electricity is supplied from the power source to the electrically-heated catalyzer.

9. The method of controlling a hybrid vehicle according to claim 7, wherein when it is determined that there is an abnormality in the electrically-heated catalyzer, supplying electricity from the power source to the electrically-heated catalyzer is inhibited.

10. The method of controlling a hybrid vehicle according to claim 9, wherein when it is determined that there is an abnormality in the electrically-heated catalyzer, electric power control is performed so that supplying electricity from the power source to the electrically-heated catalyzer is inhibited and the electricity storage device is charged by the power source.

11. The method of controlling a hybrid vehicle according to claim 7, wherein the determination of occurrence of an abnormality is performed by determining an electrical resistance of the electrically-heated catalyzer when electricity is supplied from the electricity storage device to the electrically-heated catalyzer.

* * * * *

UNITED STATES PATENT AND TRADEMARK OFFICE
CERTIFICATE OF CORRECTION

PATENT NO.       : 8,091,663 B2
APPLICATION NO.  : 12/464316
DATED            : January 10, 2012
INVENTOR(S)      : Shinji Ichikawa It is certified that error appears in the above-identified patent and that said Letters Patent is hereby corrected as shown below:

At column 1, line number 41 delete "attract" insert --attracted--.

At column 1, line number 45 after hybrid vehicle, delete "a vehicle".

At column 1, line number 56 after therefore delete ",".

At column 4, line number 41 delete "there of" insert --thereof--.

At column 5, line number 56 after receiving delete "6".

At column 5, line number 61 after 110 delete "," insert --.--.

Signed and Sealed this
Sixth Day of November, 2012

David J. Kappos
*Director of the United States Patent and Trademark Office*